(12) United States Patent
Tanji

(10) Patent No.: US 8,184,859 B2
(45) Date of Patent: May 22, 2012

(54) ROAD MARKING RECOGNITION APPARATUS AND METHOD

(75) Inventor: Jou Tanji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1047 days.

(21) Appl. No.: 11/289,502

(22) Filed: Nov. 30, 2005

(65) Prior Publication Data

US 2007/0041614 A1 Feb. 22, 2007

(30) Foreign Application Priority Data

Aug. 18, 2005 (JP) ................................. 2005-237434

(51) Int. Cl.
*G06K 9/00* (2006.01)

(52) U.S. Cl. ........ 382/104; 382/103; 382/209; 382/181; 701/23; 701/28; 701/300; 701/301; 701/302

(58) Field of Classification Search .................. 382/103, 382/104, 209, 181; 701/28, 300, 301
See application file for complete search history.

(56) References Cited

U.S. PATENT DOCUMENTS

| | | | |
|---|---|---|---|
| 4,214,265 A | | 7/1980 | Olesen |
| 5,465,308 A * | | 11/1995 | Hutcheson et al. ............ 382/159 |
| 5,555,312 A * | | 9/1996 | Shima et al. .................. 382/104 |
| 5,987,174 A * | | 11/1999 | Nakamura et al. ............ 382/199 |
| 6,199,014 B1 * | | 3/2001 | Walker et al. ................. 701/211 |
| 6,266,442 B1 * | | 7/2001 | Laumeyer et al. ............ 382/190 |
| 7,295,683 B2 * | | 11/2007 | Yamamoto et al. ........... 382/104 |
| 2002/0042676 A1 * | | 4/2002 | Furusho ........................ 701/300 |
| 2003/0072471 A1 * | | 4/2003 | Otsuka et al. ................. 382/103 |
| 2004/0103009 A1 * | | 5/2004 | Wahlbin et al. .................. 705/4 |
| 2004/0234124 A1 * | | 11/2004 | Nakai et al. ................... 382/154 |

FOREIGN PATENT DOCUMENTS

DE 102004003850 8/2005
(Continued)

OTHER PUBLICATIONS

Office Action issued Dec. 12, 2007 for corresponding German Application No. 102005063199.1.
Tadayoshi Shioyama, et al., "Image Analysis of Crosswalk", Image Analysis and Processing 2001. Proceedings 11$^{th}$ International Conference on Sep. 26-28, 2001, pp. 168-173.

(Continued)

*Primary Examiner* — Brian Q Le
*Assistant Examiner* — Julian Brooks
(74) *Attorney, Agent, or Firm* — Fujitsu Patent Center

(57) ABSTRACT

An object of this invention is to provide a technique to correctly recognize road markings by a simple processing. This road marking recognition method: obtaining image data of a road, and storing the image data into an image data storage; detecting a first road marking in the image data stored in the image data storage, and storing position data of the first road marking into a storage; detecting a second road marking in the image data stored in the image data storage, and storing position data of the second road marking into a storage; judging based on the position data stored in the storage, whether or not a predefined proper mutual positional relationship between the first and second road markings is established; and evaluating a confidence degree for the detection result of the first and second road markings by using a result of the judging. For example, in a case of the road markings such as a crosswalk and a stop line, the stop line and the crosswalk have to be arranged in this order when viewing from the vehicle. Such a positional relationship is confirmed to evaluate the confidence degree.

15 Claims, 10 Drawing Sheets

FOREIGN PATENT DOCUMENTS

| | | |
|---|---|---|
| JP | 7-141592 A | 6/1995 |
| JP | 10-097699 A | 4/1998 |
| JP | 2001-357396 A | 12/2001 |

OTHER PUBLICATIONS

"Japanese Office Action", mailed by JPO and corresponding to Japanese application No. 2005-237434 on Jul. 13, 2010.

* cited by examiner

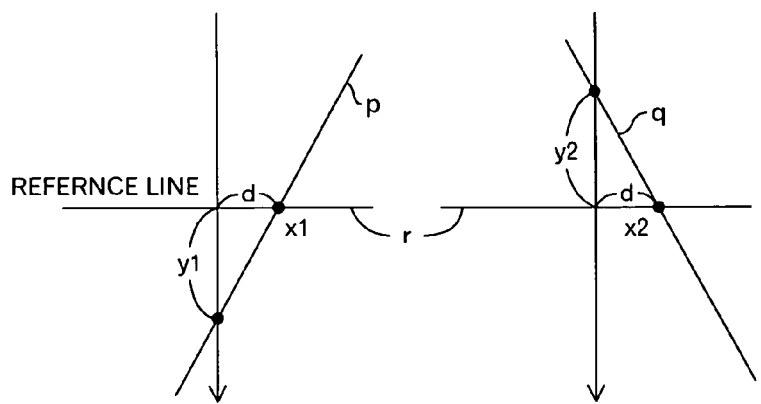
FIG.4A          FIG.4B
| x1 | y1 | CONFIDENCE DEGREE | RECOGNITION FLAG |
|---|---|---|---|
| 10 | 40 | 1 | OFF |
| x2 | y2 | CONFIDENCE DEGREE | RECOGNITION FLAG |
|---|---|---|---|
| 80 | −40 | 1 | OFF |
FIG.5
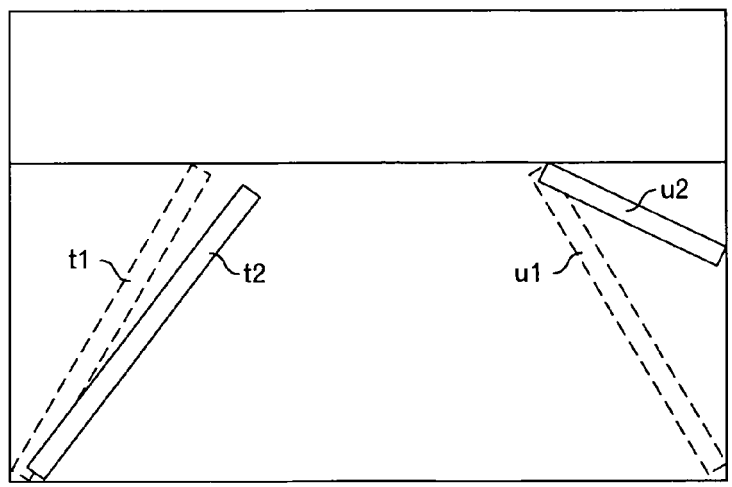
FIG.6

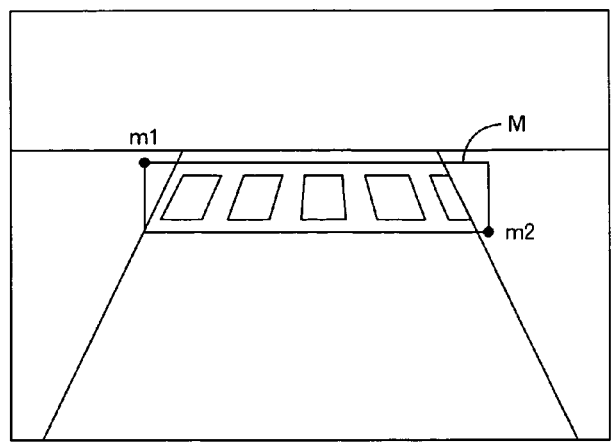
FIG.10
| ID | TIME | x1 | y1 | x2 | y2 | CONFIDENCE DEGREE | RECOGNITION FLAG |
|---|---|---|---|---|---|---|---|
| 00015 | 9:50:40 | 1 | 1 | 51 | 81 | 1 | OFF |
FIG.11
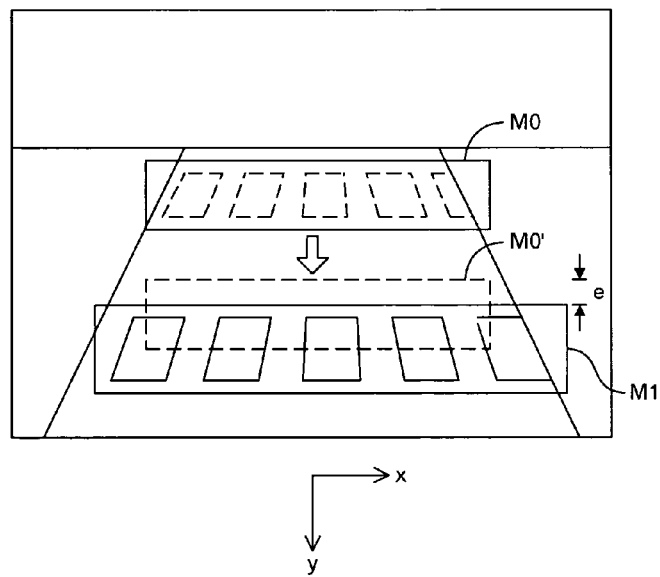
FIG.12

| ID | TIME | x1 | y1 | x2 | y2 | CONFIDENCE DEGREE | RECOGNITION FLAG |
|---|---|---|---|---|---|---|---|
| 00014 | 9:50:40 | 5 | 5 | 61 | 86 | 1 | OFF |

ROAD MARKING RECOGNITION APPARATUS AND METHOD

TECHNICAL FIELD OF THE INVENTION

This invention relates to a technique to recognize road markings.

BACKGROUND OF THE INVENTION

For example, U.S. Pat. No. 5,987,174 discloses a road monitoring apparatus by an image processing for judging changes of the intensity and color of the road immediately before its own vehicle to enable to separate a traffic lane from the road by the intensity and color, thereby enabling to certainly recognize the traffic lane. Specifically, the road monitoring apparatus includes a camera A to take a color image of the front view in a traveling direction of the vehicle; a display unit B to display the processing result of the image data taken by the camera A while superimposing it on the original image data; an extraction processing circuit to extract pixels satisfying a predetermined extraction color condition from a screen by the image data; a color sampling circuit to sample color data from the extracted pixels; an extraction condition determining unit for determining an extraction condition based on the sampled color data. The road monitoring apparatus recognizes the traffic lane based on the extracted pixels, and further judges a lighting condition of the traveling road based on the color data sampled by the extraction condition-determining unit. According to the judgment result, the iris mechanism and the color conversion gain are controlled. However, this publication does not disclose a point that road markings such as a crosswalk and a stop line are recognized. In addition, even if the road marking is individually recognized by the technique described on this publication, the misrecognition may frequently occur, because a lot of road markings have a simple shape.

Thus, the road marking may individually be recognized by the conventional technique. However, there are problems in which the misrecognition may frequently occur or a time-consuming processing is necessary in order to decrease the misrecognition. However, because the vehicle is running, when it takes too much time to process one frame, the difference with a frame to be processed next becomes large. This causes further misrecognition and/or leakage of recognition. In addition, almost all the applications using the recognition of the road marking require a real-time processing.

SUMMARY OF THE INVENTION

Therefore, an object of this invention is to provide a technique to decrease misrecognition or leakage of the recognition occurred when the road marking is recognized, by a simple processing without using a time-consuming processing.

A road marking recognition method according to this invention includes: obtaining image data of a road, and storing the image data into an image data storage; detecting a first road marking in the image data stored in the image data storage, and storing position data of the first road marking into a storage; detecting a second road marking in the image data stored in the image data storage, and storing position data of the second road marking into the storage; judging based on the position data stored in the storage, whether or not predefined mutual positional relationship at a normal time between the first and second road markings is established; and evaluating a confidence degree for the detection results of the first and second road markings by using a result of the judging.

For example, in a case of the road markings such as a crosswalk and a stop line when the vehicle goes into an intersection, the stop line and the crosswalk has to be arranged in this order when viewing from the vehicle. In addition, when the vehicle goes out the intersection, the stop line does not exist, and only the crosswalk must be disposed in front of the vehicle. Therefore, in a case where such predefined mutual positional relationship is not established for the detection result, there is possibility that the misdetection has occurred for either or both of them. Therefore, it is possible to evaluate the confidence degree (e.g. increase or decrease the confidence degree) to judge whether or not both of them are finally treated as "recognized" based on the judgment result for such predefined mutual position relationship.

Moreover, the aforementioned detecting the first road marking may include: calculating a virtual position of the first road marking from vehicle speed data and the past position data stored in the storage; and evaluating the confidence degree of the first road marking from the current position data and the virtual position data, which are stored in the storage. By carrying out the judgment using such continuity of the detection result, the misrecognition can be avoided. Incidentally, the same processing may be carried out for the detecting the second road marking.

Furthermore, the method of this invention may further include: recognizing a white line delimiting traffic lanes in the image data stored in the image data storage, and storing position data of the recognized white line into the storage; and limiting a processing region of the image data based on the position data of the white line stored in the storage. Thus, it becomes possible to reduce the processing load, and to enhance the processing speed.

In addition, the aforementioned recognizing the white line may include evaluating a confidence degree of the white line from the position data of the past-recognized white line and the current position data of the white line, which are stored in the storage. Incidentally, when the position data of the white line is specified as a straight line (point and inclination), for example, it is possible to confirm whether or not the white line is detected at the same position without moving the white line itself on the image data.

The method according to this invention is carried out by a program and a computer hardware, and this program is stored in a storage medium or a storage device such as a flexible disk, a CD-ROM, an optical magnetic disk, a semiconductor memory, and a hard disk. Further, the program may be distributed as a digital signal through a network. Incidentally, intermediate processing results are temporarily stored in a storage device such as a main memory.

BRIEF DESCRIPTION OF THE DRAWINGS

FIG. 4A is a diagram showing an example of data for the left white line, and FIG. 4B is a diagram showing an example of data for the right white line;

FIG. 5 is a diagram showing an example of data stored in the white line data storage;

FIG. 6 is a diagram showing an example of a detected white line;

FIG. 10 is a diagram to explain the region of the crosswalk;

FIG. 11 is a diagram showing an example of crosswalk data;

FIG. 12 is a diagram showing a time-varying manner of the crosswalk region;

DETAILED DESCRIPTION OF THE PREFERRED EMBODIMENTS

Figure 1:
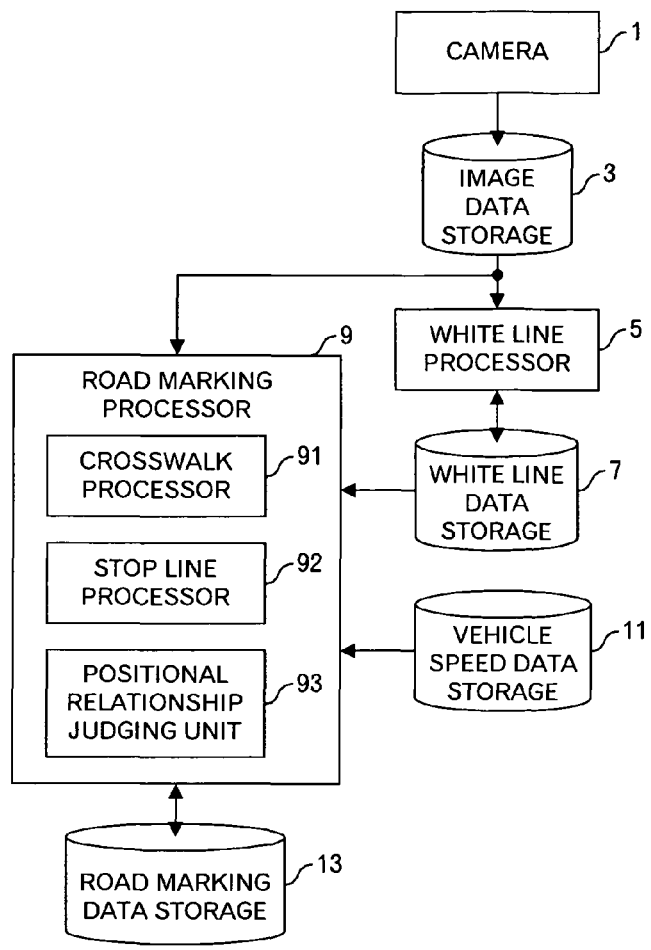
FIG. 1 is a functional block diagram in an embodiment of this invention.

FIG. 1 shows a functional block diagram of a road marking recognition apparatus according to an embodiment of this invention. The road marking recognition apparatus has a camera 1 installed, for example, toward the front of the vehicle, an image data storage 3 to store the image data taken by the camera 1, a white line processor 5 to carry out detection of the white line and the like by using the image data stored in the image data storage 3, a white line data storage 7 to store processing results and the like by the white line processor 5, a vehicle speed data storage 11, a road marking processor 9 to carry out processings using the data stored in the image data storage 3, the white line data storage 7 and the vehicle speed data storage 11, and a road marking data storage 13 to store processing results and the like by the road marking processor 9. In addition, the road marking processor 9 includes a crosswalk processor 91 to carry out detection of the crosswalk and the like, a stop line processor 92 to carry out detection of the stop line and the like, and a positional relationship judging unit 93 to judge the mutual positional relationship between the detected road markings and the like.

Next, a processing of the road marking recognition apparatus will be explained using FIGS. 2 to 17. The camera 1 periodically takes images, and stores the taken image data into the image data storage 3. A processing described below is carried out every time the image data is newly stored into the image data storage 3. Incidentally, as for the image data, necessary indexes are calculated, for example, every time the image is taken, and the camera 1 is adjusted based on the indexes. Therefore, it is supposed that the image data taken next is adjusted as much as possible to have an appropriate quality for the processing described below.

Figure 3:
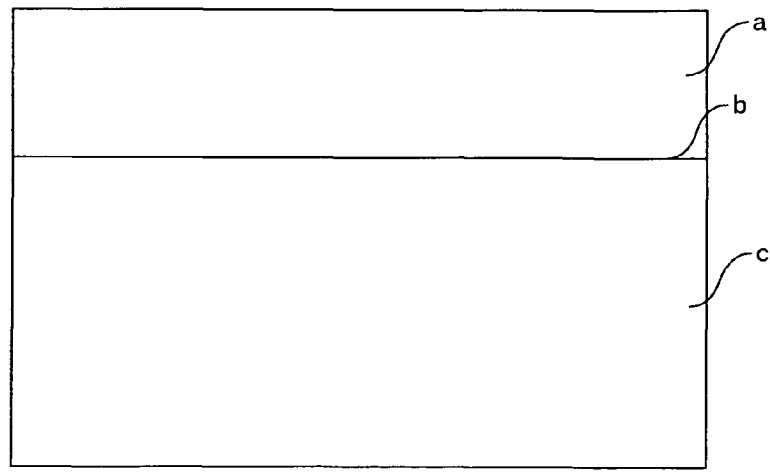
FIG. 3 is a diagram showing an example of image data taken by the camera.

Next, the white line processor 5 carries out a white line detection processing using the image data stored in the image data storage 3 (step S1). The white line detection processing is carried out only for a region c under a horizontal line b by identifying the horizontal line b to exclude a region a above the horizontal line b in a case where the image data as shown in FIG. 3, for example, is read out. Thus, the processing load is reduced. However, in a case where the horizontal line b cannot be detected, or the like, the entire image data may be processed. Incidentally, specific contents of the white line detection processing may be the same as the conventional technique such as detection by the edge detection using the intensity difference and the labeling, detection of the straight line by Haugh transform, or detection method using vanishing points. In addition, in this embodiment, the white lines appear at both sides of the vehicle, and the white lines are individually detected.

In the white line detection processing, when a left white line p as shown in FIG. 4A, for example, is detected, the coordinate x1 of an intersection of the reference line r and the white line p, and the distance y1 between the reference line r and the white line p at a position away from the coordinate x1 by only the unit distance d on the reference line r as the inclination y1 are identified. Similarly, when a right white line q as shown in FIG. 4B is detected, the coordinate x2 of an intersection of the reference line r and the white line q, and the distance y2 between the reference line r and the white line q at a position away from the coordinate x2 by only the unit distance d on the reference line r as the inclination y2 are identified. Such data is firstly stored in a storage device such as a main memory.

Incidentally, the definition of the inclination is not limited to examples shown in FIGS. 4A and 4B. It is also possible to adopt, as the inclination, the distance between an intersection of a vertical line and the reference line r and the coordinate x1 or x2 when the vertical line is drawn downwardly from an intersection of a straight line, which is parallel to the reference line r and is away from the reference line r by the unit distance d in the vertical direction, and the white line p or q to the reference line r.

Next, the white line processor 5 judges whether or not any white line could be detected this time at the step S1 (step S3). In a case where the white line could not be detected this time, it judges whether or not data of any already detected white line is stored in the white line data storage 7 (step S5). In a case where the data of the already detected white line exists, because the white line is lost this time, it decrements a confidence degree for the white line whose data is stored in the white line data storage 7 (step S7). The decrementing value is a predefined value. The data stored in the white line data storage 6 will be explained later in detail. Incidentally, there is a case where a lower limit is set for the confidence degree, and in such a case, the confidence degree does not fall below the lower limit. The upper limit may be set similarly to the lower limit. Then, the processing shifts to the processing in FIG. 7 through a terminal A. On the other hand, in a case where the data of the already detected white line does not exist in the white line data storage 7, the processing shifts to the processing in FIG. 7 through the terminal A.

On the other hand, in a case where the white line could be detected this time at the step S3, the white line processor 5 judges whether or not the data of the already detected white line is stored in the white line data storage 7 (step S9). In a case where the data of the already detected white line is not stored in the white line data storage 7, because it means that the white line is firstly detected, the white line processor 5 stores the detection result into the white line data storage 7 (step S11). After the step S11, the processing shifts to the processing in FIG. 7 through the terminal A.

The data stored in the white data storage 7 is data as show in FIG. 5, for example. The upper row indicates data of the left white line, and includes the coordinate x1 on the reference line, the inclination y1, the confidence degree, and a recognition flag. The lower row indicates data of the right white line, and includes the coordinate x2 on the reference line, the inclination y2, the confidence degree, and a recognition flag.

Incidentally, the recognition flag has not been set at the step S11, and an initial value is set as the confidence degree at the step S11.

On the other hand, in a case where it is judged that the data of the already detected white line is stored in the white line data storage 7, the white line processor 5 calculates the difference between the already detected white line and the currently detected white line (step S13). For each of the right and the left, the difference between the x coordinates and the difference between the inclinations y. For example, the sum of the differences is also calculated. Instead of the sum of the differences, a value of a predefined function into which the differences are substituted may be calculated. In addition, two values may be separately handled.

Then, the white line processor 5 judges whether or not the difference is equal to or lower than a predetermined value (step S15). For example, it is judged whether or not the sum of the differences is equal to or lower than a predetermined value relating to the sum of the differences, or whether or not the difference between x coordinates is equal to or lower than a predetermined value relating to the x coordinate and the difference between the inclinations is equal to or lower than a predetermined value relating to the inclination. For example, as shown in FIG. 6, the already detected left white line t1 and the currently detected left white line t2 are detected, and when compared, it is judged that the differences are lower than the predetermined values. In addition, the already detected right white line u1 and the currently detected white line u2 are detected, and when compared, it is judged that the differences exceed the predetermined values.

When the differences exceed the predetermined values, it is assumed that the possibility that the detection result is misdetection is high, and the white line processor 5 decrements the confidence degree for the white line without changing the value of the x coordinate and the value of the inclination of the white line. The decrementing value is a value determined in advance. Then, the processing shifts to step S23. On the other hand, when the differences are equal to or lower than the predetermined values, the white line processor 5 stores the data of the currently detected white line (i.e. x coordinate value and the inclination y) into the white line data storage 7 (step S19). In addition, it increments the confidence degree for the white line (step S21).

Next, the white line processor 5 judges whether or not the confidence degree for the white line, which is stored in the white line data storage 7 is equal to or greater than a predefined value (step S23). In a case where the confidence degree for the white line is lower than the predefined value, because it is still insufficient to judge that the white line was recognized, the white line processor 5 sets the recognition flag in the white line data storage 7 OFF (step S25). Then, the processing shifts to the processing in FIG. 7 through the terminal A. On the other hand, in a case where the confidence degree for the white line is equal to or greater than the predefined value, the white line processor 5 sets the recognition flag in the white line data storage 7 ON (step S27). Then, it outputs the processing result to a function using the white line (step S29). The processing shifts to the processing in FIG. 7 through the terminal A. Incidentally, the left white line and the right white line are individually processed in the aforementioned processing.

Thus, by using the continuity of the detection result for the white line, the validity of the detection result is judged to reflect it to the confidence degree.

Next, the processing in FIG. 7 will be explained. The road marking processor 9 confirms whether or not the recognition flag in the white line data storage 7 is set ON (step S31). In a case where the recognition flag is set OFF, because the white line is not recognized, the road marking processor 9 sets the entire image data stored in the image data storage 3 as a processing region (step S33). Then, the processing shifts to step S37. On the other hand, in a case where the recognition flag for the white line is set ON, it sets the inside of the white lines as the processing region (step S35). As shown in FIG. 8A, in a case where both the left and right white lines were recognized, a trapezoidal region Z1 surrounded by both the white lines and the horizontal line is a processing region. In addition, as shown in FIG. 8B, in a case where the right white line is not recognized and only the left white line has been recognized, a trapezoidal region Z2 surrounded by the left white line and the horizontal line is a processing region. Of course, the left may be changed to the right.

Then, the crosswalk processor 91 of the road marking processor 9 carries out a crosswalk processing (step S37). The crosswalk processing will be explained using FIGS. 9 to 12. First, the crosswalk processor 91 carries out a detection processing of the crosswalk for the processing region (step S51). For example, the edge detection using the difference of the intensity and/or labeling are carried out to extract elements of the crosswalk. Because the crosswalk has a monotonous stripe pattern, the detection method using a matter that an interval between the elements is constant, and/or a matter that the width of the element is constant, and the pattern matching may be used. Basically, the conventional technique can detect the crosswalk. Therefore, any further description is omitted here. Incidentally, it is not necessary to hold data concerning individual white line portions constituting the crosswalk. As shown in FIG. 10, a region M of the crosswalk is identified. In this case, for example, the region M of the crosswalk can be identified when the coordinates of the upper left point m1 and the coordinates of the lower right point m2 are held. Incidentally, because the crosswalk cannot be always detected, and the position the crosswalk exists is limited, an ID is assigned to the crosswalk every time it is detected near the horizontal line, and the ID is managed until it cannot be detected.

Next, the crosswalk processor 91 judges whether or not the crosswalk could be detected at the step S51 (step S53). In a case where the crosswalk could not be detected, it judges whether or not sight of the crosswalk is lost, that is, whether or not crosswalk data (described later), which was stored in the road marking data storage 13 within a predetermined period from the photographing time of the image data being processed or a time identified by a frame number of the image data being processed, exists (step S55). The predetermined period is calculated using the speed data of the vehicle. That is, it is possible to calculate from what frames beforehand or how long beforehand the currently detected crosswalk could be detected by the camera 1 based on the current speed of the vehicle, the distance from the vehicle to the limit point the camera 1 can be seen, and the distance to the currently detected crosswalk. In a case where sight of the crosswalk is not lost, that is, a case where the crosswalk has not been detected, the processing returns to the original processing through a terminal C. On the other hand, in a case where it is judged that the crosswalk stored in the road marking data storage 12 within the predetermined period from the photographing time of the image data being processed or the time identified by the frame number of the image data being processed exists, it means that sight of the crosswalk is lost. Therefore, the crosswalk processor 91 decrements the confidence degree for the crosswalk. The decrementing value is a value determined in advance.

Furthermore, the crosswalk processor 91 judges whether or not a condition that the crosswalk data stored in the road marking data storage 13 is cleared is satisfied, for example, whether or not the crosswalk can not be detected during a predetermined number of frames or more (i.e. during a predetermined threshold period or more) (step S59). In a case where the condition that the crosswalk data is cleared is not satisfied, the processing returns to the original processing through the terminal C. On the other hand, in a case where the condition that the crosswalk data is cleared is satisfied, the crosswalk processor 91 clears the crosswalk data in the road marking data storage 13 (step S61). Then, the processing returns to the original processing.

On the other hand, in a case where the crosswalk could be detected this time, the crosswalk processor 91 judges whether or not the already detected crosswalk exists, i.e. whether or not the crosswalk data has already been stored in the road marking data storage 13 (step S63). In a case where the crosswalk data has not been stored in the road marking data storage 13 yet, it stores region data of the currently detected crosswalk into the road marking data storage 13 (step S65). The road marking data storage 13 stores data shown in FIG. 11, for example. As shown in FIG. 11, the road marking data storage 13 stores an ID of the crosswalk, the photographing time, coordinates (x1, y1) of the upper left of the region, coordinates (x2, y2) of the lower right of the region, the confidence degree and the recognition flag. Incidentally, the ID is newly assigned to the currently detected crosswalk, and is stored. The initial value is set to the confidence degree. However, the recognition flag is not set at the step S65. Then, the processing returns to the original processing.

In a case where the already detected crosswalk exists, the crosswalk processor 91 moves the region of the already detected crosswalk while taking into account the current speed stored in the vehicle speed data storage 11 (step S67). For example, it calculates the distance based on the time difference between the time stored in the road marking data storage 13 and the current time, and the speed of the vehicle, and calculates how long the region of the already detected crosswalk has to be moved on the image, by using the calculated distance and the preset number of pixels (or the preset coordinate value) per the unit distance. Then, the crosswalk processor 91 moves the region of the already detected crosswalk by the calculated distance on the image. As shown in FIG. 12, when the region M0 of the already detected crosswalk is moved according to the speed of the vehicle, the region M0 is moved to the region M0' represented by the dotted line. In FIG. 12, x-axis is set in a horizontal direction of the image, and y-axis is set in a vertical direction of the image. Then, the region of the crosswalk is moved in the y-axis direction.

After that, the crosswalk processor 91 calculates the positional difference e between the region M1 of the currently detected crosswalk and the region M0' of the crosswalk after movement (step S69). In the example of FIG. 12, the difference e in the y-axis direction is calculated. Then, the crosswalk processor 91 judges whether or not the difference e calculated at the step S69 is within a predefined value (step S71). In a case where the difference e exceeds the predefined value, the crosswalk processor 91 decrements the confidence degree for the crosswalk in the road marking data storage 13 without storing the region data of the crosswalk (step S73). Thus, when the difference e exceeds the predetermined value, there is possibility the misdetection occurs. Therefore, the confidence degree is decremented by the predetermined value. Then, the processing returns to the original processing.

On the other hand, in a case where the difference e is within the predefined value, the crosswalk processor 91 stores the region data of the currently detected crosswalk into the road marking data storage 13 (step S75). Then, it increments the confidence degree for the crosswalk by the predetermined value in the road marking data storage 13 (step S77). Then, the processing returns to the original processing.

By doing so, the validity of the detection result is judged by using the continuity of the detection result to reflect it to the confidence degree.

Figure 7:
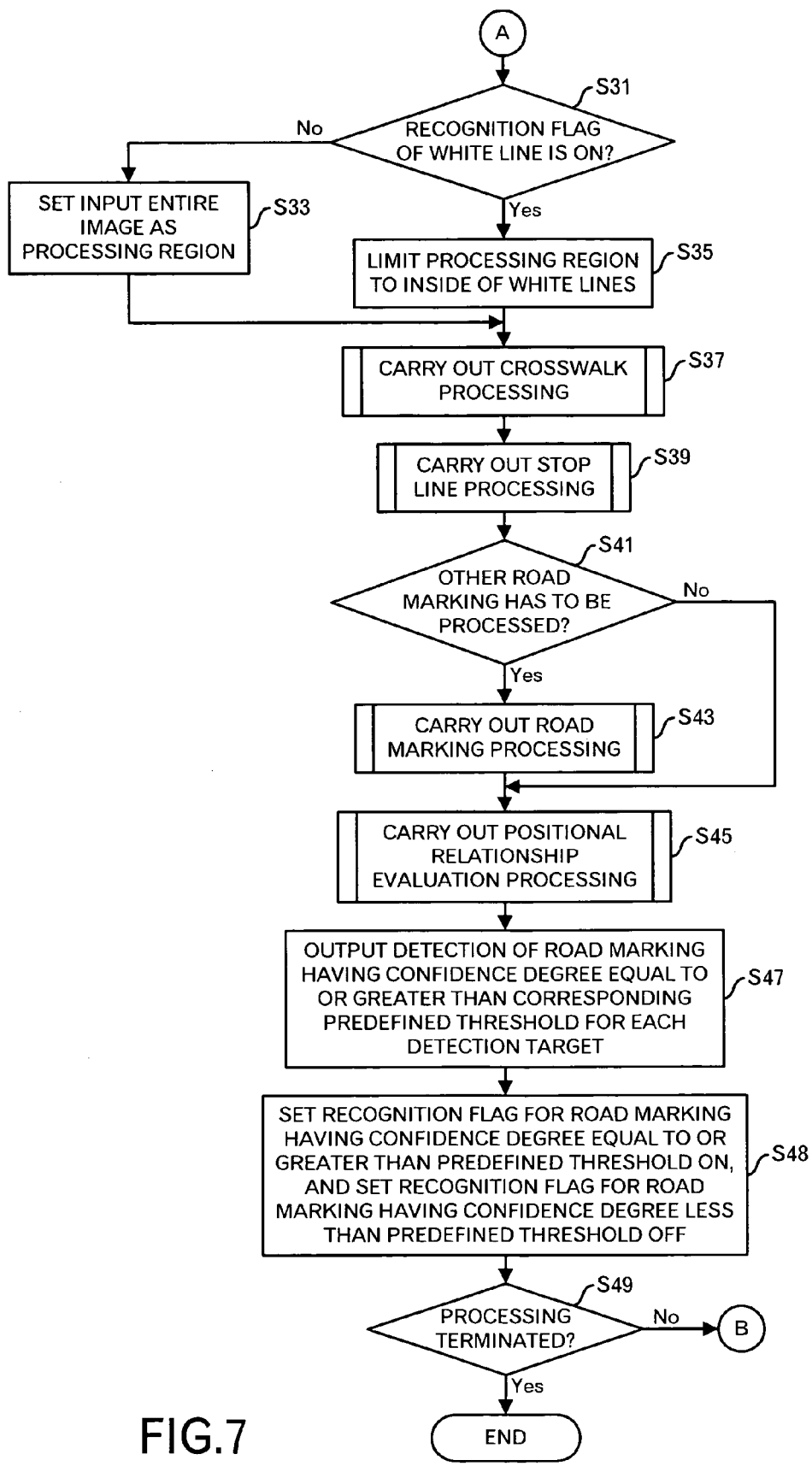
FIG. 7 is a diagram showing a second portion of the main processing flow in the embodiment of this invention.
Figure 8A:
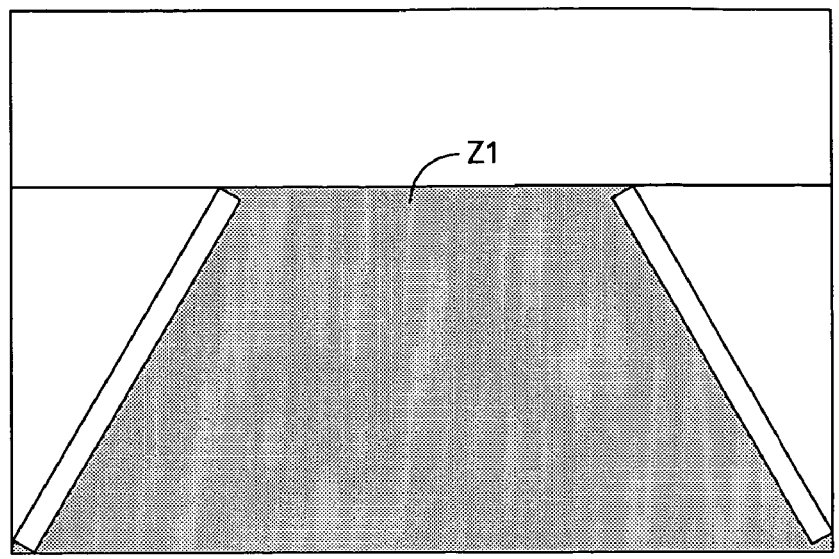
FIGS. 8A and 8B are diagrams showing subsequent processing regions in a case where the white line is recognized.
Figure 8B:
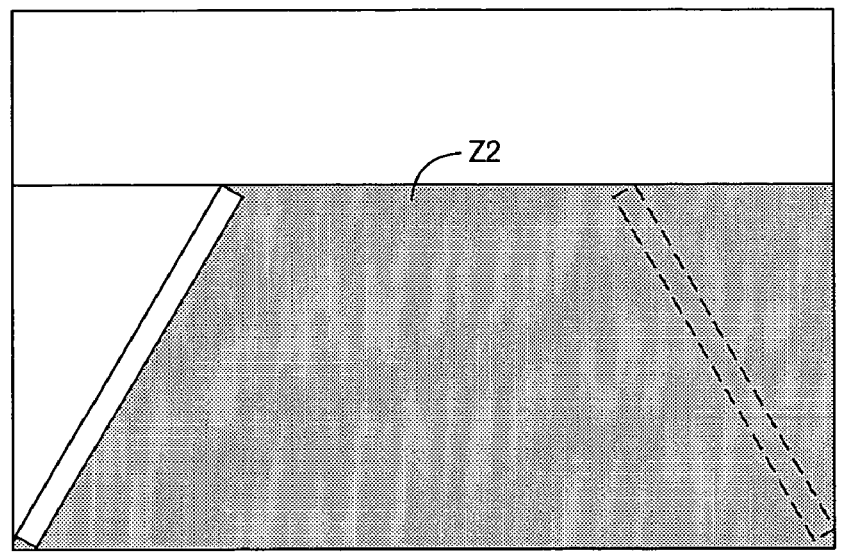
Figure 9:
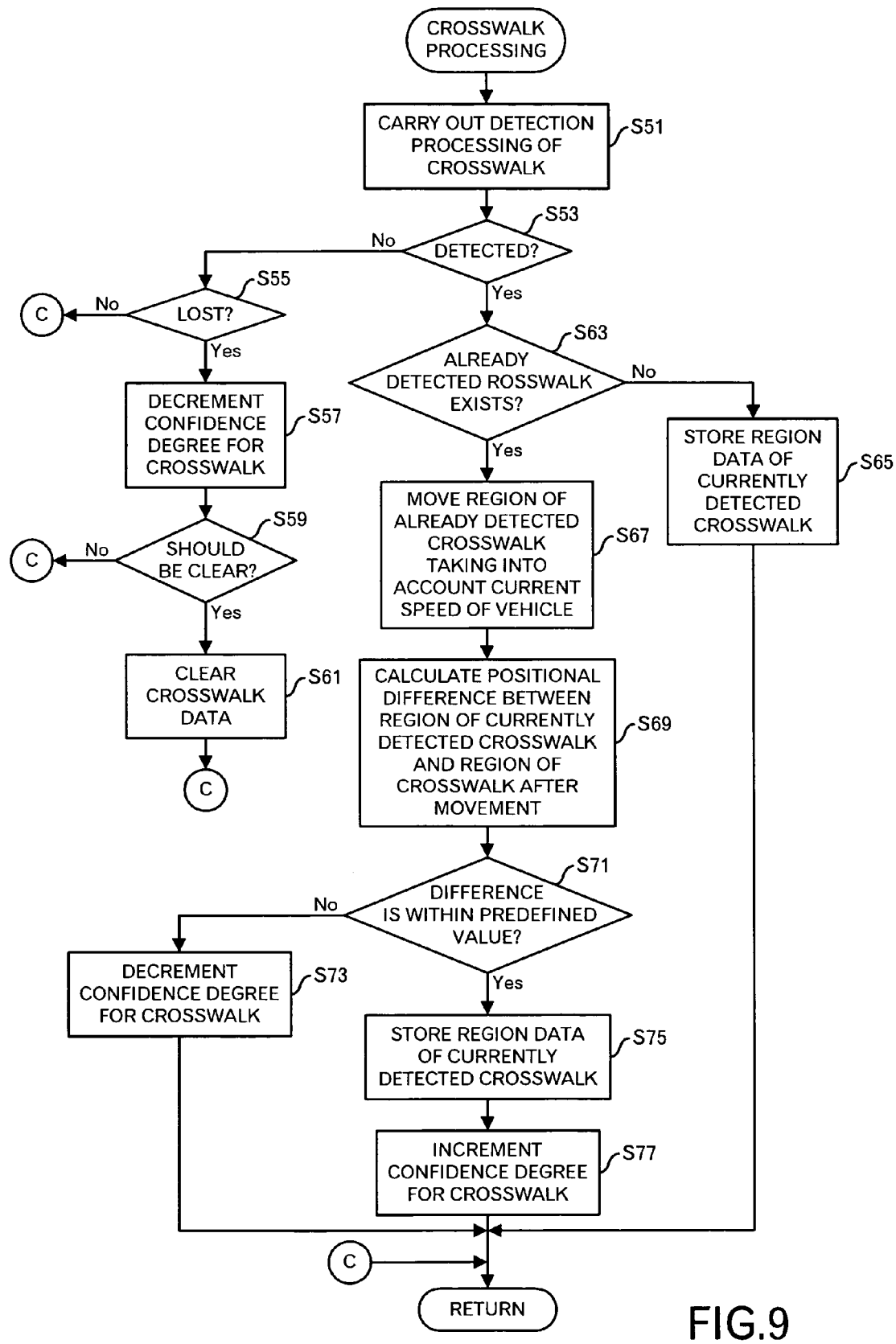
FIG. 9 is a diagram showing a processing flow of a crosswalk processing.
Figure 13:
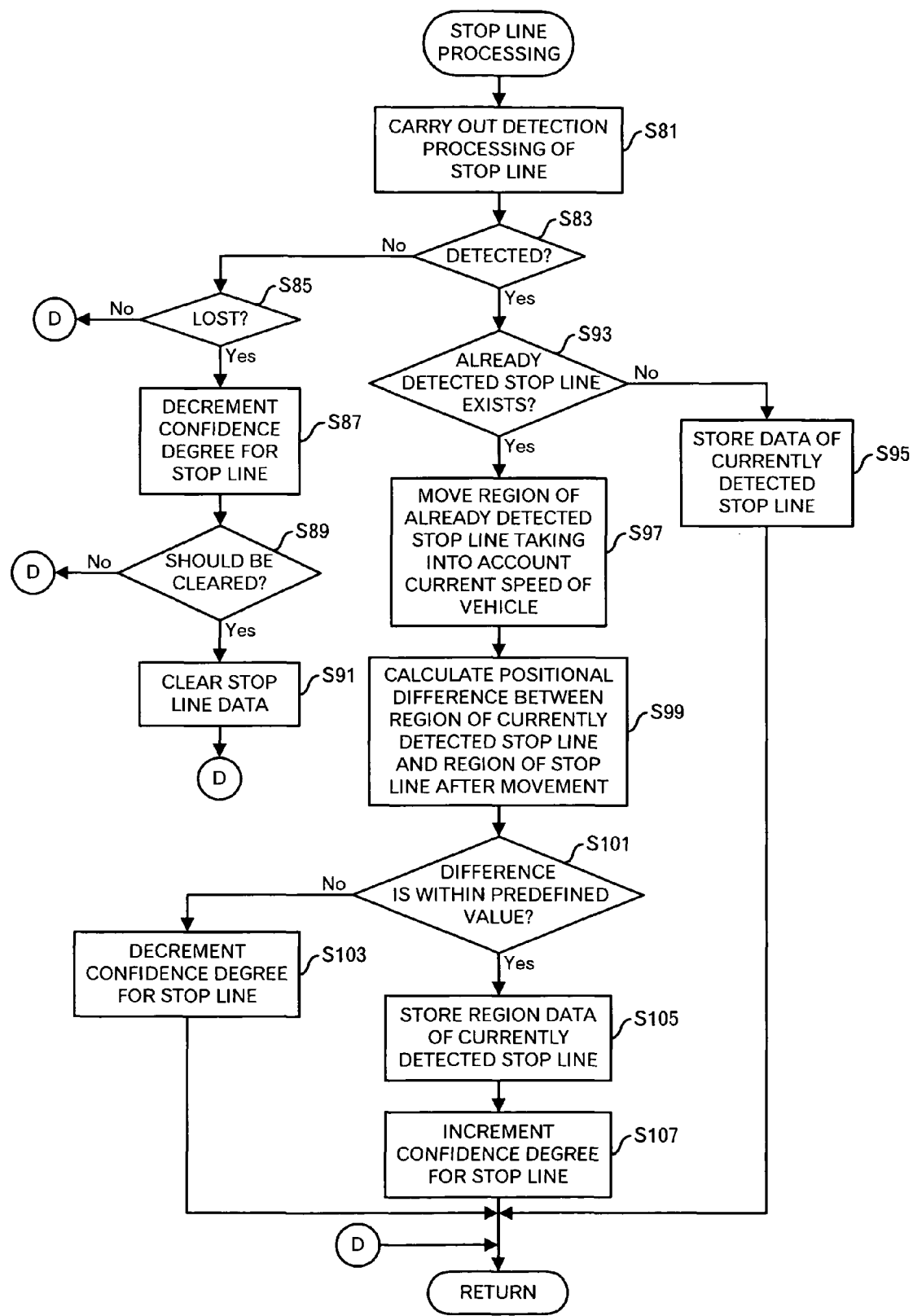
FIG. 13 is a diagram showing a processing flow of a stop line processing.

Returning to the explanation of FIG. 7, next, the stop line processor 92 of the road marking processor 9 carries out a stop line processing (step S39). The stop line processing will be explained using FIGS. 13 to 15. Firstly, the stop line processor 92 carries out a detection processing of the stop line for the processing region (step S81). For example, elements of the stop line are extracted by the edge extraction using the intensity difference and/or labeling. Because the stop line is a simple straight stripe, it is possible to use a method to count the number of pixels, which have intensity greater than a predefined value and are arranged straightly, a pattern matching method or the like. Basically, because the stop line can be detected by the conventional methods, further explanation is omitted here. Incidentally, in order to simplify the following processing, as show in FIG. 14, a region S of the stop line is identified. In this case, the region S of the stop line can be specified when the coordinates of the upper left point s1 and the coordinates of the lower right point s2 are held. Incidentally, unlike the white line, the stop line cannot be always detected, and the positions the stop line exists are limited. Therefore, an ID is assigned to the stop line when it is detected firstly near the horizontal line, and is managed until it cannot be detected.

Next, the stop line processor 92 judges whether or not the stop line could be detected at the step S81 (step S83). In a case where the stop line could not be detected, the stop line processor 92 judges whether or not sight of the stop line is lost, that is, whether or not stop line data (described later), which was stored in the road marking data storage 13 within a predetermined period from the photographing time of the image data being processed or a time identified by a frame number of the image data being processed, exits (step S85). In a case where sight of the stop line is not lost, that is, a case where the stop line has not been detected, the processing returns to the original processing through a terminal D. On the other hand, in a case where it is judged that the stop line stored in the road marking data storage 13 within the predetermined period from the photographing time of the image data being processed exists, it means that sight of the stop line is lost. Therefore, the stop line processor 92 decrements the confidence degree for the stop line (step S87). The decrementing value is a value determined in advance.

Furthermore, the stop line processor 92 judges whether or not a condition that the stop line data stored in the road marking data storage 13 is cleared is satisfied, for example, whether or not the stop line cannot be detected during a predetermined number of frames or more (i.e. during a predetermined threshold period or more) (step S59). In a case where the condition that the stop line data is cleared is not satisfied, the processing returns to the original processing through the terminal D. On the other hand, in a case where the condition that the stop line data is cleared is satisfied, the stop line processor 92 clears the stop line data in the road marking data storage 13 (step S91). Then, the processing returns to the original processing through the terminal D.

Figures 14, 15:
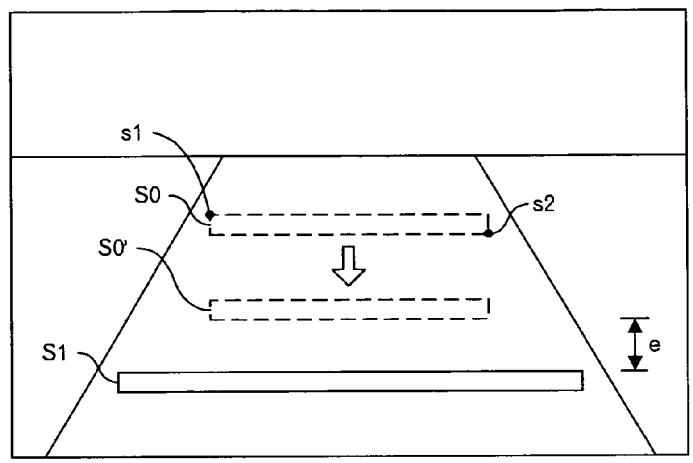
FIG. 14 is a diagram showing a time-varying manner of the stop line region.
FIG. 15 is a diagram showing an example of the stop line data.
Figure 16:
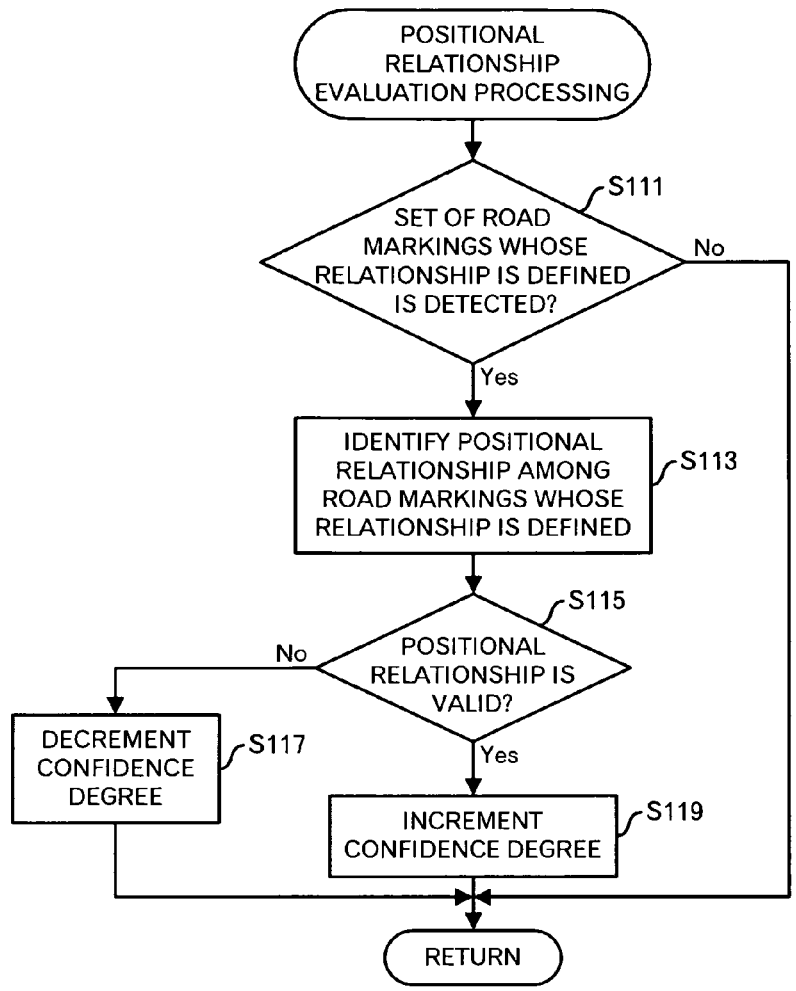
FIG. 16 is a diagram showing a processing flow of a positional relationship evaluation processing.

On the other hand, in a case where the stop line could be detected at this time, the stop line processor 92 judges whether or not the already detected stop line exists, i.e. whether or not data of the stop line has already been stored in the road marking data storage 13 (step S93). In a case where the data of the stop line has not been stored in the road marking data storage 13 yet, it stores region data of the currently detected stop line into the road marking data storage 13 (step S95). The road marking data storage 13 stores data as shown in FIG. 15, for example. As shown in FIG. 15, the road marking data storage 13 stores an ID of the stop line, the photographic time, the coordinates (x1, y1) of the upper left point of the stop line region, the coordinates (x2, y2) of the lower right point of the region, the confidence degree and the confidence flag. Incidentally, the ID is newly assigned to the currently detected stop line, and is stored. The initial value is set to the confidence degree. However, the recognition flag is not set at the step S95. After that, the processing returns to the original processing.

In a case where the already detected stop line exists, the stop line processor 92 moves the region of the already detected stop line while taking into account the current speed of the vehicle stored in the vehicle speed data storage 11 (step S97). For example, it calculates the distance based on the time difference between the time stored in the road marking data storage 13 and the current time, and the speed of the vehicle, and calculates how long the region of the already detected stop line has to be moved on the image, by using the calculated distance and the preset number of pixels (or the preset coordinate value) per the unit distance. Then, the stop line processor 92 moves the region of the already detected stop line by the calculated distance on the image. As shown in FIG. 14, when the region S0 of the already detected stop line is moved according to the speed of the vehicle, the region S0 is moved to the region S0' represented by the dotted line. In FIG. 14, x-axis is set in a horizontal direction of the image, and y-axis is set in a vertical direction of the image. Then, the region of the stop line is moved in the y-axis direction.

After that, the stop line processor 92 calculates the positional difference e between the region S1 of the currently detected stop line and the region S0' of the stop line after movement (step S99). In the example of FIG. 14, the difference e in the y-axis direction is calculated. Then, the stop line processor 92 judges whether or not the difference e calculated at the step S99 is within a predefined value (step S101). In a case where the difference e exceeds the predefined value, the stop line processor 92 decrements the confidence degree for the stop line in the road marking data storage 13 without storing the region data of the stop line (step S103). Thus, when the difference e exceeds the predetermined value, there is possibility the misdetection occurs. Therefore, the confidence degree is decremented by the predetermined value. Then, the processing returns to the original processing.

On the other hand, in a case where the difference e is within the predefined value, the stop line processor 92 stores the region data of the currently detected stop line into the road marking data storage 13 (step S105). Then, it increments the confidence degree for the stop line by the predetermined value in the road marking data storage 13 (step S107). Then, the processing returns to the original processing.

Thus, the validity of the detection result is judged by using the continuity of the detection result to reflect it to the confidence degree.

Returning to the explanation of FIG. 7, next, the road marking processor 9 judges whether or not other road markings should be processed (step S41). In the explanation above, the examples that the white line, the crosswalk and the stop line are processed are indicated. However, it is possible to carry out the recognition processing for other road markings such as a direction arrow, and speed marking. If it is set that other road markings are processed, the road marking processor 9 carries out a processing for such road markings (step S43). On the other hand, in a case where other road markings are not processed, the processing shifts to the step S45.

Next, the positional relationship-judging unit 93 of the road marking processor 9 carries out a positional relationship evaluation processing (step S45). This processing will be explained using FIGS. 16 and 17. The positional relationship-judging unit 93 judges whether or not a set of road markings whose relationship is defined in advance is detected (step S111). The set of the road markings whose relationship is defined in advance is a set of the stop line and the crosswalk, for example. It is possible to define the relationship between other road markings, and it is also possible to define the relationship among the three or more road markings instead of the two road markings. In addition, because there is no meaning if old data is used, it is judged for the road markings detected from the same image data or the nearest image data, i.e. for the road markings to which the same time or the nearest time is registered in the road marking data storage 13.

Figure 17:
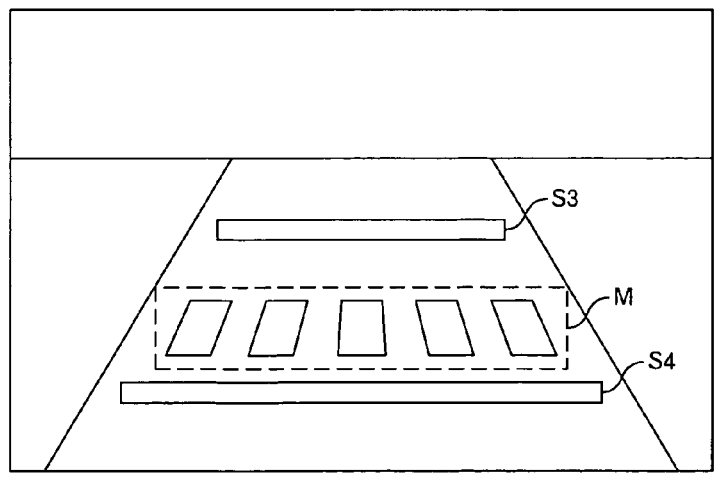
FIG. 17 is a diagram to explain the validity of the positional relationship.

In a case where any or all of the road markings whose relationship is defined in advance are not detected, the processing returns to the original processing. On the other hand, in a case where the set of the road markings whose relationship is defined in advance is detected, the positional relationship-judging unit 93 identifies the positional relationship among the road markings whose relationship is defined in advance (step S113). For example, in a case where the set is composed of the crosswalk and the stop line and both of them are detected, the stop line rather than the crosswalk exists at the vehicle side. As shown in FIG. 17, in a case where the position of the crosswalk is located at M, and the position of the stop line is located at S3, that is, a case where the stop line exists farther than the crosswalk when viewing from the vehicle, it is judged that the valid positional relationship is not established. On the other hand, in a case where the position of the stop line is located at S4, because the stop line exists nearer than the crosswalk when viewing from the vehicle, the valid positional relationship is established. Incidentally, in a case where the x-axis is defined as being parallel to the horizontal line, and the positive side of the y-axis is defined toward the vehicle side, the value of the y-axis of the stop line should be larger than the value of the y-axis of the crosswalk.

As described above, the positional relationship judging unit 93 judges whether or not the positional relationship for the set of the road markings is valid (step S115). In a case where it is judged that the positional relationship is not valid, it decrements the confidence degrees for all the road markings included in the set of the road markings by the predetermined value (step S117). Then, the processing returns to the original processing. Thus, in a case where the detection results have inconsistency, because it is difficult to judge which is the reason, the confidence degrees for all the relating road markings are decremented. On the other hand, in a case where the positional relationship is valid, it increments the confidence degrees for all the road markings included in the set of the road markings by the predetermined value (step S119). Then, the processing returns to the original processing.

By carrying out the aforementioned processing, the confidence degree can be re-evaluated based on the mutual positional relationship of the road markings.

Returning to the explanation of FIG. 7, the road marking processor 9 identifies the road marking having the confidence degree equal to or greater than a corresponding predefined threshold among road markings to be detected, by using the confidence degrees of the road markings to be detected, which are stored in the road marking data storage 13, and outputs the processing result including the recognition result of the road markings to other functions using the recognition result (step S47). In addition, it sets the recognition flag for the road markings having the confidence degree equal to or greater than the predefined threshold ON, and sets the recognition flag for the road markings having the confidence degree less than the predefined threshold OFF (step S48).

Figure 2:
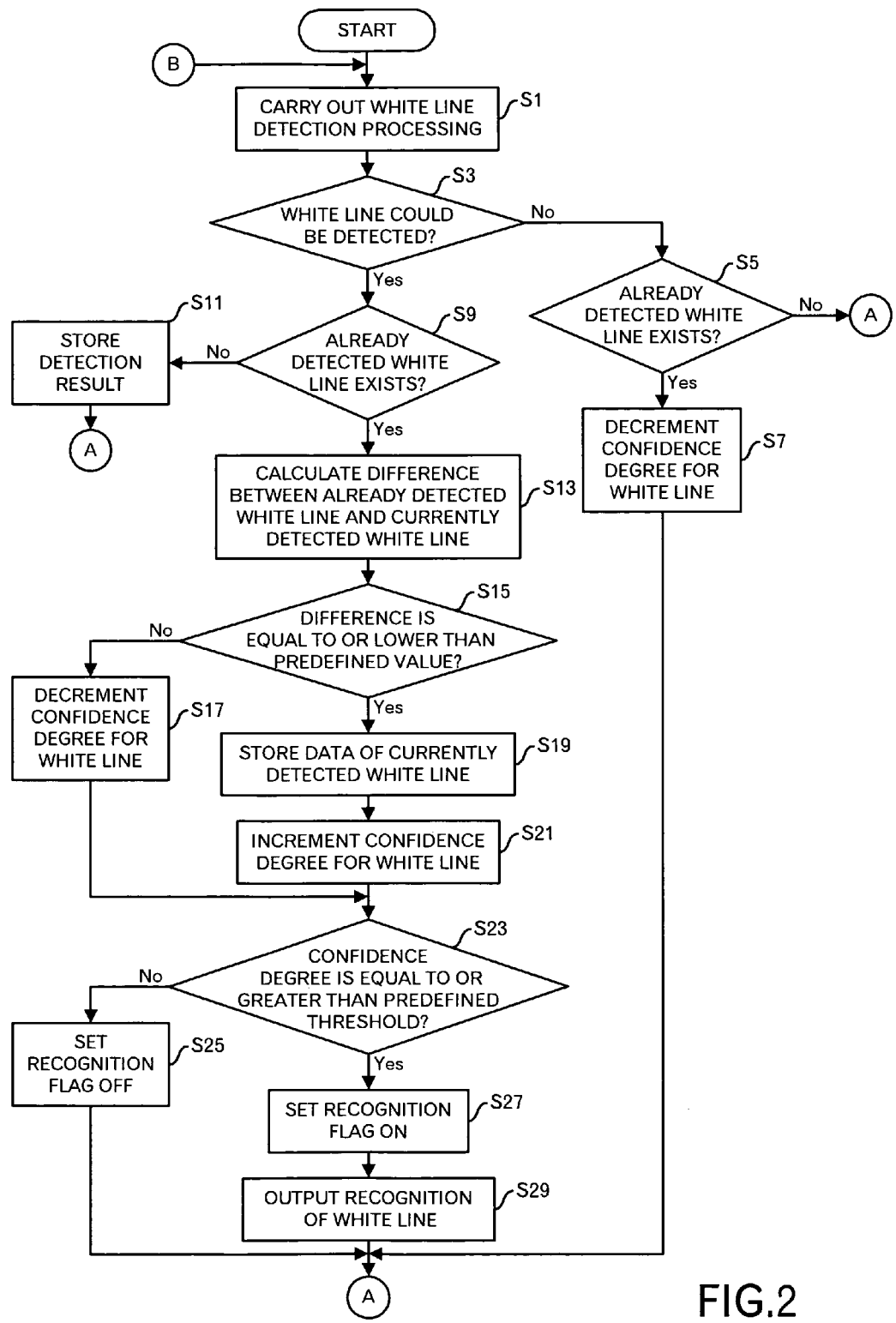
FIG. 2 is a diagram showing a first portion of a main processing flow in the embodiment of this invention.

After that, the apparatus judges whether or not the processing should be terminated (step S49), and when the processing is not terminated, the processing returns to the step S1 of FIG. 2 through the terminal B. When the processing is terminated, the processing is ended.

As described above, as for the detection of the individual road markings, it is possible to use a conventional detection method including extracting the road markings from the binary image by the edge extraction or the like for the input image data, by using the feature values of the road markings, and the like. Because the complicated processing is not carried out in that detection processing, the processing time is shortened. In a case where the white line delimiting the traffic lane could be detected, because the region to be processed for the detection of other road markings is limited, the processing speed is expected to be further enhanced. As for the recognition of the white line, the misrecognition is decreased by using the continuity of the detection positions. Furthermore, as for the recognition processing for the road markings other than the white line, because it is judged whether or not the road marking is treated as "recognized" by evaluating the confidence degree while taking into account the continuity of the detected positions of the detected road marking and the positional relationship with other road markings, the misrecognition is decreased.

Although one embodiment of this invention is described above, this invention is not limited to this. For example, the functional blocks shown in FIG. 1 may not respectively correspond to actual program modules. In addition, any function may be implemented by hardware.

Moreover, for example, the crosswalk processing and the stop line processing may be carried out in parallel. Furthermore, there are steps which can be executed in parallel or whose execution order can be exchanged as long as the processing result does not vary.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A road marking recognition apparatus, comprising:
an image data storage device;
a unit that obtains image data of a road and stores said image data into said image data storage device;
a road marking data storage device; and
a road marking processor, and
wherein said road marking processor detects a stop line within a traffic lane delimited by white lines in said image data stored in said image data storage device, and stores position data of said stop line into said road marking data storage device, and further detects a crosswalk within said traffic lane delimited by said white lines in said image data stored in said image data storage device and stores position data of said crosswalk into said road marking data storage device, and
said road marking processor judges based on said position data stored in said road marking data storage device, whether or not the crosswalk appears after the stop line in a vehicle-traveling direction on said image data, and evaluates a confidence degree for detection results of the stop line and the crosswalk by using a judgment result of whether or not the crosswalk appears after the stop line in the vehicle-traveling direction.

2. The road marking recognition apparatus as set forth in claim 1, wherein said road marking processor comprises:
a unit to calculate a virtual position of said crosswalk from vehicle speed data and past position data stored in said road marking data storage device; and
a unit to calculate said confidence degree for said crosswalk from current position data stored in said road marking data storage device and said virtual position data.

3. The road marking recognition apparatus as set forth in claim 1, wherein said road marking processor comprises:
a unit to calculate a virtual position of said stop line from vehicle speed data and past position data stored in said road marking data storage device, and to evaluate said confidence degree for said stop line from current position data stored in said road marking data storage device and said virtual position data.

4. The road marking recognition apparatus as set forth in claim 1, further comprising:
a white line processor to recognize a white line delimiting traffic lanes in said image data stored in said image data storage, and stores position data of the recognized white line into a white lane data storage device, and limits a processing region of said image data based on said position data of said white line, which is stored in said white lane data storage device.

5. The road marking recognition apparatus as set forth in claim 4, wherein said white line processor comprises a unit to evaluate a confidence degree for said white line from said position data of the past recognized white line and current position data of said white line, which are stored in said white lane data storage device.

6. A computer-implemented road marking recognition method, comprising:
obtaining image data of a road;
storing said image data into an image data storage;
detecting a crosswalk within a traffic lane delimited by white lines in said image data stored in said image data storage;
storing position data of said crosswalk into a storage;
detecting a stop line within said traffic lane delimited by said white lines in said image data stored in said image data storage;
storing position data of said stop line into said storage;
judging based on said position data stored in said storage, whether or not the crosswalk appears after the stop line in a vehicle-traveling direction on said image data; and
evaluating a confidence degree for detection results of said crosswalk and said stop line by using a result of said judging.

7. The computer-implemented road marking recognition method as set forth in claim 6, wherein said detecting said crosswalk comprises: calculating a virtual position of said crosswalk from vehicle speed data and the past position data stored in said storage; and evaluating said confidence degree for said crosswalk from the current position data and said virtual position data, which are stored in said storage.

8. The computer-implemented road marking recognition method as set forth in claim 6, wherein said detecting said stop line comprises: calculating a virtual position of said stop line from vehicle speed data and the past position data stored in said storage; and evaluating said confidence degree for said stop line from the current position data and said virtual position data, which are stored in said storage.

9. The computer-implemented road marking recognition method as set forth in claim 6, further comprising: recognizing a white line delimiting traffic lanes in said image data stored in said image data storage, and storing position data of the recognized white line into said storage; and limiting a processing region of said image data based on said position data of said white line, which is stored in said storage.

10. The computer-implemented road marking recognition method as set forth in claim 9, wherein said recognizing comprises evaluating a confidence degree for said white line from said position data of the past recognized white line and the current position data of said white line, which are stored in said storage.

11. A non-transitory computer-readable storage medium storing a road marking recognition program, which when executed by a computer, causes the computer to execute a process, comprising:

obtaining image data of a road;

storing said image data into an image data storage;

detecting a crosswalk within a traffic lane delimited by white lines in said image data stored in said image data storage;

storing position data of said crosswalk into a storage;

detecting a stop line within said traffic lane delimited by said white lines in said image data stored in said image data storage;

storing position data of said stop line into said storage;

judging based on said position data stored in said storage, whether or not said crosswalk appears after the stop line in a vehicle-traveling direction on said image data; and evaluating a confidence degree for detection results of said crosswalk and said stop line by using a result of said judging.

12. The non-transitory computer-readable storage medium as set forth in claim 11, wherein said detecting said crosswalk comprises: calculating a virtual position of said crosswalk from vehicle speed data and the past position data stored in said storage; and evaluating said confidence degree for said crosswalk from the current position data and said virtual position data, which are stored in said storage.

13. The non-transitory computer-readable storage medium as set forth in claim 11, wherein said detecting said stop line comprises: calculating a virtual position of said stop line from vehicle speed data and the past position data stored in said storage; and evaluating said confidence degree for said stop line from the current position data and said virtual position data, which are stored in said storage.

14. The non-transitory computer-readable storage medium as set forth in claim 11, further comprising: recognizing a white line delimiting traffic lanes in said image data stored in said image data storage, and storing position data of the recognized white line into said storage; and limiting a processing region of said image data based on said position data of said white line, which is stored in said storage.

15. The non-transitory computer-readable storage medium as set forth in claim 14, wherein said recognizing comprises evaluating a confidence degree for said white line from said position data of the past recognized white line and the current position data of said white line, which are stored in said storage.

\* \* \* \* \*